US011338360B2

(12) United States Patent
Sarkisian et al.

(10) Patent No.: US 11,338,360 B2
(45) Date of Patent: May 24, 2022

(54) DEVICE AND METHOD FOR FORMING A METAL MATRIX COMPOSITE VEHICLE COMPONENT

(71) Applicant: Intellectual Property Holdings, LLC, Cleveland, OH (US)

(72) Inventors: Ryan G. Sarkisian, Cleveland, OH (US); Dan T. Moore, Cleveland Heights, OH (US)

(73) Assignee: Intellectual Property Holdings, LLC, Cleveland, OH (US)

( * ) Notice: Subject to any disclaimer, the term of this patent is extended or adjusted under 35 U.S.C. 154(b) by 186 days.

(21) Appl. No.: 15/425,284

(22) Filed: Feb. 6, 2017

(65) Prior Publication Data

US 2017/0225225 A1  Aug. 10, 2017

Related U.S. Application Data

(60) Provisional application No. 62/398,042, filed on Sep. 22, 2016, provisional application No. 62/291,200, filed on Feb. 4, 2016.

(51) Int. Cl.
*B22D 19/02* (2006.01)
*B22D 19/08* (2006.01)
(Continued)

(52) U.S. Cl.
CPC ............. *B22D 19/02* (2013.01); *B22D 17/02* (2013.01); *B22D 17/24* (2013.01); *B22D 19/08* (2013.01);
(Continued)

(58) Field of Classification Search
CPC ........ B22D 19/02; B22D 17/02; B22D 17/24; B22D 19/08; B22D 21/007; B62D 21/00;
(Continued)

(56) References Cited

U.S. PATENT DOCUMENTS 3,286,974 A   11/1966  Dean et al.
3,305,618 A    2/1967  Sucher
(Continued)

FOREIGN PATENT DOCUMENTS

CN        1063692 C    3/2001
CN      101282795 A   10/2008
(Continued)

OTHER PUBLICATIONS

Mancha-Molinar, H., et al. "Role of T7 Heat Treating on the Dimensional Stability of Automotive A319 Al Alloys." SAE Technical Paper Series, 2004 (Year: 2004).*
(Continued)

*Primary Examiner* — Paul A Wartalowicz
*Assistant Examiner* — Ryan L Heckman
(74) *Attorney, Agent, or Firm* — Calfee, Halter & Griswold LLP

(57) ABSTRACT

An exemplary method for making a metal matrix composite vehicle component includes: using a mold including male and female die portions having mold surfaces and a plurality of spacers; heating the mold to a casting temperature; placing a ceramic preform on the plurality of spacers, the ceramic preform being spaced apart from at least one of the mold surfaces by the spacers; closing the mold to form a mold cavity between the mold surfaces of the male and female die portions, the ceramic preform being disposed within the mold cavity; providing molten metal into the mold cavity; and pressurizing the molten metal to a casting pressure for a casting duration to infiltrate the ceramic preform thereby forming the metal matrix composite vehicle component.

18 Claims, 8 Drawing Sheets

(51) Int. Cl.
  *B22D 17/02*   (2006.01)
  *B22D 17/24*   (2006.01)
  *B22D 21/00*   (2006.01)
  *B62D 21/00*   (2006.01)
  *C22F 1/04*    (2006.01)
  *F16D 65/10*   (2006.01)
  *F16D 65/12*   (2006.01)

(52) U.S. Cl.
  CPC ........... *B22D 21/007* (2013.01); *B62D 21/00* (2013.01); *C22F 1/04* (2013.01); *F16D 65/10* (2013.01); *F16D 65/12* (2013.01); *F16D 2200/003* (2013.01); *F16D 2250/0015* (2013.01)

(58) Field of Classification Search
  CPC . C22F 1/04; F16D 65/10; F16D 65/12; F16D 2200/003; F16D 2250/0015
  See application file for complete search history.

(56) References Cited

U.S. PATENT DOCUMENTS

| | | | |
|---|---|---|---|
| 3,919,382 A | 11/1975 | Smarook | |
| 3,933,335 A | 1/1976 | Maruyama et al. | |
| 4,039,703 A | 8/1977 | Kamijo | |
| 4,587,707 A | 5/1986 | Nishida et al. | |
| 4,803,334 A | 2/1989 | Burke et al. | |
| 4,830,932 A | 5/1989 | Donomoto et al. | |
| 4,871,008 A | 10/1989 | Dwivedi et al. | |
| 4,998,578 A | 3/1991 | Dwivedi | |
| 5,024,795 A | 6/1991 | Kennedy | |
| 5,167,271 A | 12/1992 | Lange et al. | |
| 5,234,045 A | 8/1993 | Cisko | |
| 5,268,339 A | 12/1993 | Aghajanian | |
| 5,350,004 A | 9/1994 | Rocazella | |
| 5,413,194 A | 5/1995 | Kulis, Jr. et al. | |
| 5,511,603 A | 4/1996 | Brown et al. | |
| 5,529,620 A | 6/1996 | Corbett et al. | |
| 5,531,425 A | 7/1996 | Skibo et al. | |
| 5,535,857 A | 7/1996 | Barlow | |
| 5,575,112 A | 11/1996 | Scheubel | |
| 5,620,791 A | 4/1997 | Dwivedi et al. | |
| 5,646,351 A | 7/1997 | Good et al. | |
| 5,698,240 A | 12/1997 | Haguchi | |
| 5,738,818 A | 4/1998 | Atmur et al. | |
| 5,743,983 A | 4/1998 | Ogata | |
| 5,752,564 A * | 5/1998 | Callahan | B22C 9/02 164/137 |
| 5,958,551 A | 9/1999 | Garcia-Ochoa | |
| 6,062,351 A | 5/2000 | Strasser et al. | |
| 6,178,691 B1 | 1/2001 | Caron | |
| 6,180,258 B1 | 1/2001 | Klier | |
| 6,193,915 B1 | 2/2001 | Lo et al. | |
| 6,216,829 B1 | 4/2001 | Daudi | |
| 6,298,957 B1 * | 10/2001 | Haug | C04B 41/009 188/251 M |
| 6,309,743 B1 | 10/2001 | Fujita | |
| 6,358,628 B1 | 3/2002 | Kajikawa et al. | |
| 6,383,656 B1 | 5/2002 | Kimura et al. | |
| 6,544,636 B1 | 4/2003 | Fukunaga et al. | |
| 6,547,850 B1 | 4/2003 | Skibo et al. | |
| 6,601,284 B1 | 8/2003 | Wall | |
| 6,648,055 B1 * | 11/2003 | Haug | B22D 19/14 164/113 |
| 6,662,852 B2 | 12/2003 | Gegel | |
| 6,684,561 B2 | 2/2004 | Poret | |
| 6,752,709 B1 | 6/2004 | Skibo et al. | |
| 7,459,110 B2 | 12/2008 | Lenke et al. | |
| 7,793,703 B2 | 9/2010 | Wood et al. | |
| 7,975,750 B2 | 7/2011 | Dessouki et al. | |
| 8,016,018 B2 | 9/2011 | Wood et al. | |
| 8,075,827 B2 | 12/2011 | Loukus et al. | |
| 8,153,541 B2 | 4/2012 | McCullough et al. | |
| 8,455,379 B2 | 6/2013 | McCullough et al. | |
| 8,550,145 B2 | 10/2013 | Wood et al. | |
| 9,145,938 B2 | 9/2015 | Wood et al. | |
| 9,429,202 B2 | 8/2016 | Moore et al. | |
| 2001/0025751 A1 | 10/2001 | Gruber et al. | |
| 2002/0025356 A1 | 2/2002 | Ingram | |
| 2002/0088599 A1 | 7/2002 | Davis et al. | |
| 2002/0117286 A1 | 8/2002 | Fujita | |
| 2003/0038001 A1 | 2/2003 | Yamaguchi et al. | |
| 2003/0159896 A1 | 8/2003 | Koizumi et al. | |
| 2004/0094285 A1 | 5/2004 | Yamaguchi et al. | |
| 2004/0118547 A1 | 6/2004 | Brown et al. | |
| 2004/0177609 A1 | 9/2004 | Moore, III et al. | |
| 2005/0035173 A1 | 2/2005 | Steel et al. | |
| 2005/0167214 A1 | 8/2005 | Yamamoto et al. | |
| 2005/0181193 A1 | 8/2005 | Lenke | |
| 2005/0183909 A1 | 8/2005 | Rau, III et al. | |
| 2005/0184421 A1 | 8/2005 | de Nagybaczon | |
| 2005/0217950 A1 | 10/2005 | Jolley, Jr. et al. | |
| 2006/0085968 A1 | 4/2006 | Yamaguchi et al. | |
| 2007/0062768 A1 | 3/2007 | Hanna et al. | |
| 2007/0119667 A1 | 5/2007 | Hanna et al. | |
| 2007/0172639 A1 | 7/2007 | Kmetz | |
| 2007/0234929 A1 | 10/2007 | Reinsch et al. | |
| 2007/0284200 A1 | 12/2007 | Hampton | |
| 2007/0284772 A1 | 12/2007 | Goller | |
| 2008/0258343 A1 | 10/2008 | Tado | |
| 2009/0020379 A1 | 1/2009 | Hanna et al. | |
| 2009/0026027 A1 | 1/2009 | Martino | |
| 2009/0078515 A1 | 3/2009 | Xia | |
| 2009/0165924 A1 | 7/2009 | Steibel et al. | |
| 2009/0309252 A1 | 12/2009 | Schuetz et al. | |
| 2009/0311541 A1 | 12/2009 | Wood et al. | |
| 2009/0312174 A1 | 12/2009 | McCullough et al. | |
| 2010/0000831 A1 | 1/2010 | Faria | |
| 2010/0001231 A1 | 1/2010 | Loukus et al. | |
| 2010/0126066 A1 | 5/2010 | Devos | |
| 2010/0152015 A1 | 6/2010 | Staudenecker et al. | |
| 2010/0276236 A1 | 11/2010 | Kim et al. | |
| 2011/0003680 A1 | 1/2011 | Lindemann et al. | |
| 2011/0061830 A1 | 3/2011 | Wood et al. | |
| 2011/0209842 A1 * | 9/2011 | Rao | B22C 21/14 164/6 |
| 2012/0067537 A1 * | 3/2012 | Hanna | B22C 21/14 164/107 |
| 2012/0080277 A1 | 4/2012 | Wood et al. | |
| 2012/0227624 A1 | 9/2012 | Loukus et al. | |
| 2012/0295784 A1 | 11/2012 | McCullough et al. | |
| 2013/0015607 A1 | 1/2013 | Ueda | |
| 2013/0048447 A1 | 2/2013 | Hanna et al. | |
| 2013/0087420 A1 | 4/2013 | Fraley et al. | |
| 2013/0167440 A1 | 7/2013 | Fischer | |
| 2013/0180812 A1 | 7/2013 | Brown et al. | |
| 2013/0264156 A1 | 10/2013 | DeConti | |
| 2013/0277155 A1 | 10/2013 | Huang et al. | |
| 2013/0295304 A1 | 11/2013 | Moore et al. | |
| 2013/0295394 A1 | 11/2013 | Moore | |
| 2014/0008893 A1 | 1/2014 | Loukus et al. | |
| 2014/0231195 A1 | 8/2014 | Amari | |
| 2014/0272451 A1 | 9/2014 | Loukus et al. | |
| 2015/0283647 A1 | 10/2015 | Kitazawa et al. | |
| 2016/0108980 A1 | 4/2016 | Moore et al. | |
| 2017/0175834 A1 | 6/2017 | Bracamonte et al. | |
| 2017/0184164 A1 | 6/2017 | Bean et al. | |

FOREIGN PATENT DOCUMENTS

| | | |
|---|---|---|
| CN | 102407286 A | 4/2012 |
| DE | 19710671 A1 | 9/1998 |
| JP | H02194132 | 7/1990 |
| JP | H0344432 | 2/1991 |
| JP | 2004360136 | 12/2004 |
| KR | 20040095874 A | 11/2004 |
| WO | 8502394 | 6/1985 |
| WO | 1999011448 | 3/1999 |
| WO | 1999032418 | 7/1999 |
| WO | 2005087575 | 9/2005 |
| WO | 2007033378 | 3/2007 |
| WO | 2009154728 | 12/2009 |

(56) References Cited

FOREIGN PATENT DOCUMENTS

| WO | 2009154734 | 12/2009 |
| WO | 2012076154 | 6/2012 |
| WO | 2015179420 A1 | 11/2015 |

OTHER PUBLICATIONS

Heaney, D.f. "Designing for Metal Injection Molding (MIM)." Handbook of Metal Injection Molding, 2012, pp. 29-49 (Year: 2012).*
Dlouhy, A., et al., "Short Fibre Reinforced MMC/ Kurzfaserverstarkter . . . A Quantitative Metallographic Study . . . ," Prakt. Metallogr., vol. 30, pp. 172-185, 1993.
Mukerji, J., "Ceramic Matrix Composites," Defence Science Journal, vol. 43, No. 4, pp. 385-395, Oct. 1993.
KS Aluminium-Technologie AG Brochure, "High-Pressure Die Cast and Squeeze Cast Engine . . . ," 6 pages. www.kspg.com/en/divisions/hardparts/ks-aluminium-technologie/ (Date unknown.).
Everwin, P., et al., "Porsche Boxster, Lokasil®-Zylinderlaufflächen: Eine neue Verbundwerkstoff-Lösung geht mit dem Porsche Boxster in Serie," ATZ. Automobiltechnische Zeitschrift, pp. 66-69, 1996 (in German).
Non-Certified English Translation of Everwin, P., et al., "Porsche Boxster, Lokasil®-Zylinderlaufflächen: Eine neue Verbundwerkstoff-Lösung geht mit dem Porsche Boxster in Serie," ATZ. Automobiltechnische Zeitschrift, pp. 66-69, 1996 Reference. Prepared by Viami International Inc.
Long, S. et al., "Processing of Al-based MMCs by Indirect Squeeze Infiltration of Ceramic Preforms . . . ," pp. 1-23, Jun. 1999.
Evans, A., et al., "Metal Matrix Composites in Industry: An Introduction and a Survey," Kluwer Academic Publishers, p. 241, 2003.
Lenke, Ilka T., et al., "Design of metal ceramic composites," Int. J. Mat. Res., vol. 97, Issue 5, pp. 676-680, 2006.
Dobrzanski, L.A., "Fabrication of ceramic preforms based on . . . ," Journal of Achievements in Materials and Manufacturing Engineering, vol. 18, Issue 1-2, pp. 71-74, Sep.-Oct. 2006.
Dobrzanski, L.A., "Influence of reinforcement shape on the structure and properties of . . . ," 11th Int'l. Research/Expert Conference, "Trends in the Development of Machinery and Associated Technology," TMT 2007, Hammamet, Tunisia, pp. 1479-1482, Sep. 5-9, 2007.
Unifrax Product Information Sheet, "Fiberfrax Ceramic Fiber Paper," Unifrax I LLC, 4 pages, 2009. www.unifrax.com.
Light-Weighting Technology by Century, Inc. 2 pages, www.light-weighting.com (Date Unknown).
Search Report for International Patent Application No. PCT/US2017/016670 dated Apr. 10, 2017.
Mancha-Molinar et al., "Role of T7 Heat Treating on the Dimensional Stability of Automotive A319 A1 Alloys," SAE Technical Paper Series, Society of Automotive Engineers, Warrendale, PA, US, vol. 2004-01-1002, Jan. 1, 2014, p. 13pp,XP009193834, ISSN: 0148-7191 p. 3-p. 6.
Mahadevan, R., et al., "Development of Selectively Reinforced Squeeze Cast Pistons," Nov. 1, 2001, XP55357185, DOI:10.4271/2001-28-0069, Retrieved from the Internet: URL://www.foundryinfo-india.org/images/pdf/72_OP.pdf on Sep. 29, 2017.
Search Report for International Patent Application No. PCT/2017/012037 dated Apr. 24, 2017.
Preliminary Report on Patentability for International Application No. PCT/US2017/016670 dated Aug. 7, 2018.
Office Action for U.S. Appl. No. 15/397,446 dated Oct. 22, 2018.
First Office Action for Chinese Patent Application No. 201780009805.4 dated Jul. 23, 2019.
Second Office Action for Chinese Patent Application No. 201780009805.4 dated Jun. 12, 2020.
Examination Report for European Patent Application No. 17704981.4 dated May 4, 2020.

* cited by examiner

DEVICE AND METHOD FOR FORMING A METAL MATRIX COMPOSITE VEHICLE COMPONENT

CROSS-REFERENCE TO RELATED APPLICATIONS

The present application claims the benefit of U.S. Provisional Application Ser. No. 62/291,200, filed on Feb. 4, 2016, entitled DEVICE AND METHOD FOR FORMING AND SQUEEZE-CASTING A COMPOSITE BRAKE DRUM and U.S. Provisional Application Ser. No. 62/398, 042, filed on Sep. 22, 2016, and entitled DEVICE AND METHOD FOR FORMING AND SQUEEZE-CASTING (ISOSTATIC INFILTRATION) A COMPOSITE BRAKE DRUM, ROTOR, OR VEHICLE COMPONENT, the disclosures of which are incorporated herein by reference in their entirety.

TECHNICAL FIELD

The present application relates generally to metal matrix composite components, and more specifically to metal matrix composite vehicle components, such as brake drums and brake rotors, and devices and methods for making the same.

BACKGROUND OF THE INVENTION

A metal matrix composite (MMC) is generally made by incorporating a reinforcing material into a metal matrix. For example, a MMC may comprise a ceramic preform that is infiltrated with a metal. A MMC generally has properties and physical characteristics different from metal that may be desirable depending on the application. For example, relative to the metal surrounding an MMC, the MMC may have higher specific strength, a higher Young's modulus, higher temperature resistance, higher transverse stiffness and strength, higher resistance to moisture absorption, higher electrical and thermal conductivity, lower density, and higher wear resistance. The particular physical properties of MMCs are often dependent on the final application and may be modified by changes in both the matrix and metal alloy used.

Vehicles may include drum brakes and/or disc brakes. A drum brake generally comprises a rotating drum-shaped part called a brake drum. Shoes or pads of the drum brake press against the interior surface of the brake drum to cause friction and reduce the rotation of the brake drum. A disc brake generally comprises a rotating brake disc or rotor. Calipers having brake pads that squeeze the exterior and interior of the brake disc to cause friction and reduce the rotation of the brake disc. During the vehicle braking process there is often a high energy transfer to the frictional surface of the brake drum or brake disc which can lead to a rise in temperature.

SUMMARY

Exemplary embodiments of metal matrix composite components and devices and methods for making metal matrix composite components are disclosed herein.

An exemplary method for making a metal matrix composite vehicle component includes: using a mold including male and female die portions having mold surfaces and a plurality of spacers; heating the mold to a casting temperature; placing a ceramic preform on the plurality of spacers, the ceramic preform being spaced apart from at least one of the mold surfaces by the spacers; closing the mold to form a mold cavity between the mold surfaces of the male and female die portions, the ceramic preform being disposed within the mold cavity; providing molten metal into the mold cavity; and pressurizing the molten metal to a casting pressure for a casting duration to infiltrate the ceramic preform thereby forming the metal matrix composite vehicle component.

An exemplary mold for making a metal matrix composite vehicle component includes: male and female die portions having mold surfaces; a mold cavity formed by the mold surfaces when the mold is in a closed condition; a plurality of spacers extending from at least one of the mold surfaces; and a plurality of spacers extending from at least one of the mold surfaces. The spacers are configured to support a preform spaced apart from at least one of the mold surfaces, and the mold is configured to receive molten metal for casting the metal matrix composite vehicle component.

For example, metal matrix composite vehicle components of the present application may be produced by using any of the methods or molds disclosed herein. For example, a metal matrix composite vehicle component may include: a metal matrix composite portion; a metal portion that is substantially free from metal matrix composite material; and an indentation extending from an outer surface of the metal portion to the metal matrix composite portion.

BRIEF DESCRIPTION OF THE DRAWINGS

These and other features and advantages of the present invention will become better understood with regard to the following description and accompanying drawings in which:

FIG. 5 is a cross-section view an exemplary brake drum removed from the casting device of FIG. 4 that is shown cross-sectioned along the line A-A;

DETAILED DESCRIPTION

Figure 1:
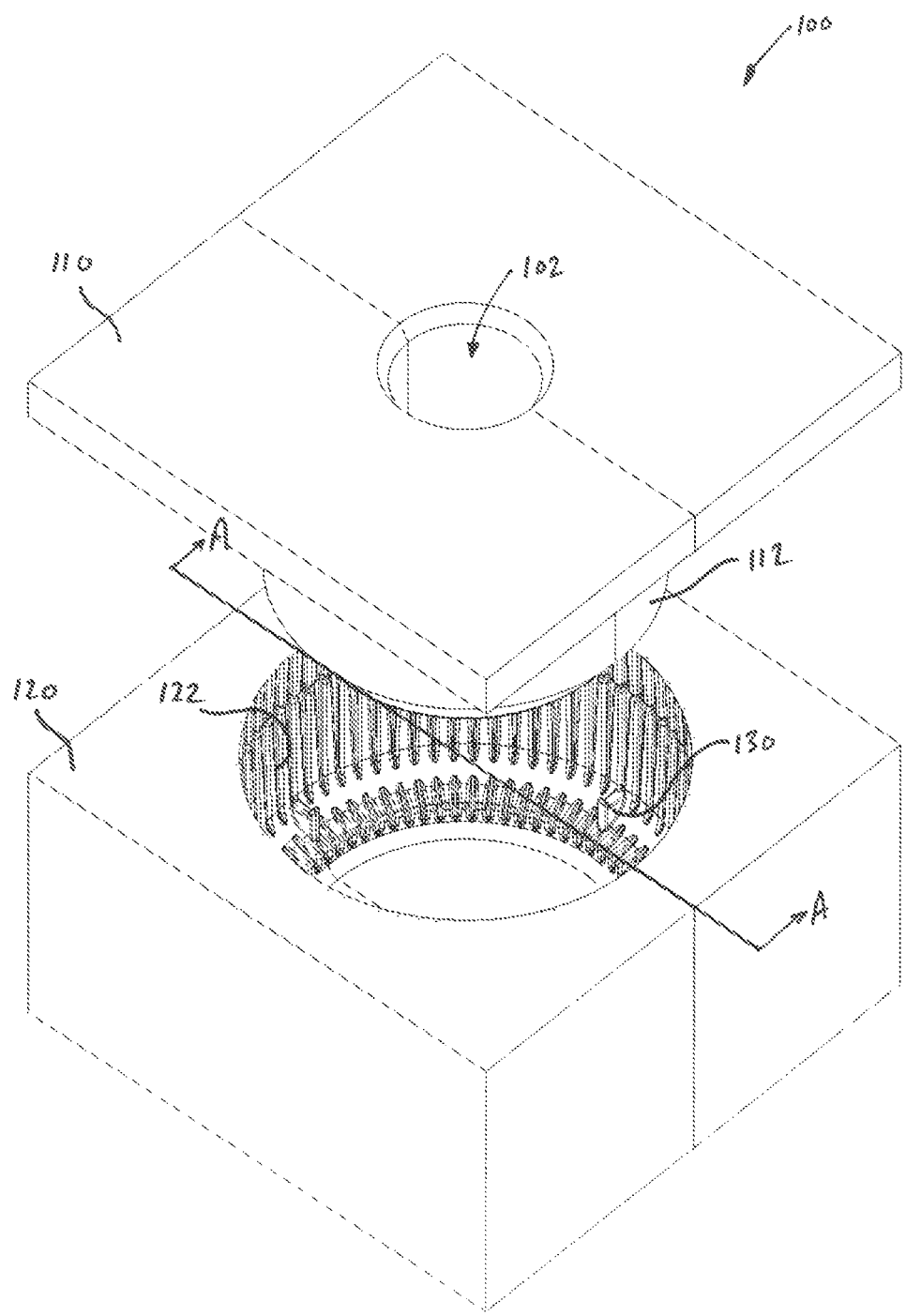
FIG. 1 is a perspective view of an exemplary casting device for a metal matrix composite break drum with the casting device in an open condition.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Also as described herein, the terms "substantially" and "about" are defined as at least close to (and includes) a given value or state (preferably within 10% of, more preferably within 1% of, and most preferably within 0.1% of). Also as described herein, the term "casting device" is defined as any device suitable for forming a metal component, such as, for example, a die or mold for shaping molten metal into a metal component.

Metal matrix composites embedded with a light weight metal, such as an aluminum alloy, are useful in many industries, such as, for example, aerospace, automotive, heavy trucks, rail, defense, and others. Components made from light weight metal alloys that include localized MMC portions may be used in any portion of a vehicle to reduce the weight of the component while maintaining or improving other characteristics of the material, such as, for example, wear resistance, durability, strength, thermal conductivity, or the like. Many different vehicle components that include localized MMC portions (i.e., the MMC portion is restricted to a certain area of the component) may be formed using the methods described in the present application. While forming rotating and rotationally symmetric components having localized MMC portions—in particular, brake drums and rotors—are discussed in detail below, other non-rotating and non-rotationally symmetric vehicle components, such as portions of a vehicle body, vehicle frame, or vehicle suspension can also be made using the methods described below.

A MMC is generally made by incorporating a reinforcing material into a metal matrix, thereby enhancing the structure of the composite material. The MMC generally comprises two portions: a primarily inorganic metal portion and a porous structure made from other inorganic components, such as fused silicon carbide. The non-metallic portion of the MMC may be incorporated into the metallic portion through additive and preform techniques.

Forming a MMC through an additive process, such as stir casting, involves incorporating the non-metallic material directly into molten metal. In particular, stir casting involves adding a nonmetallic reinforcing substance directly to molten metal while stirring the molten metal, where the surface energy of the additive is higher than the surface tension of the molten metal. These additive methods have been used to produce automotive braking components such as Alcan and Lanxide components.

These additive manufacturing techniques, however, have issues that have made mass production of MMC components prohibitively expensive. A brake rotor produced using the Duralcan technique (a stir casting technique used to combine silicon carbide with aluminum) illustrates these issues. For example, with this technique, the silicon carbide is not uniformly distributed within the aluminum alloy resulting in some particles of silicon carbide protruding from the surface of the rotor, in addition to other inconsistencies. Also, the silicon carbide particles are distributed throughout the entire brake rotor. Consequently, machining the cast part requires special tools as silicon carbide was interspersed throughout the aluminum. Various shortcomings of the Duralcan process are described in U.S. Pat. No. 6,547,850. The stir casting apparatus designed by Alcan Aluminum Company is described in U.S. Pat. No. 5,531,425.

Forming a MMC through a preform process involves forming a non-metallic preform of reinforcing material that is infiltrated with a metal alloy, such as aluminum. Applicant has developed various MMCs and methods of making MMCs, including aluminum MMCs. Examples of such MMCs and their related methods are described in U.S. Pat. No. 9,429,202 (herein "the '202 patent") and U.S. Published Patent Application No. 2016/0108980 (i.e., U.S. application Ser. No. 14/536,311; herein "the '311 application"), both of which are incorporated herein by reference in their entirety. To the extent the material incorporated by reference contradicts or is inconsistent with the present specification, the present specification will supersede any such material. The citation of any references herein is not an admission that such references are prior art to the present invention.

Rather than mixing MMC materials throughout a vehicle component, applicant has shown—e.g., in the '202 patent and '311 application—that certain vehicle brake components can be formed with localized MMC portions. These MMC components are created by providing an MMC preform in the desired location before casting the part. The molten metal used to cast the part infiltrates the ceramic preform to form a localized MMC portion of the final cast part. For example, a MMC portion can be formed on the wear surfaces of a brake rotor, as shown in FIG. 6A of the '311 application.

When forming a component—such as a vehicle component—including a MMC portion, a ceramic preform is generally made first. The ceramic compound used to form the ceramic preform may include a variety of components, such as, for example, ceramic particles, reinforcing fibers, starch, organic porous creating materials, low temperature binders, high temperature binders (e.g., colloidal silica), and/or water. These materials may be incorporated through wet and dry methods. The ceramic preform may have a porosity ranging from about 50 percent to about 80 percent, or a porosity of about 60 percent.

The ceramic compound and preform may be made by a variety of methods that produce a preform capable of being cast by the methods described herein. For example, one method of preparing a ceramic compound is disclosed below. First, the reinforcing fibers undergo in a detangling process. The dry materials (e.g., ceramic particles, reinforcing fibers, starch, and organic porous creating materials) are then added stepwise into a one-pot system and aggravated. The wet materials (e.g., low and high temperature binders and water) may then be added slowly into the same one-pot mixture, agitated, and then mixed under reduced pressure. This homogeneous one-pot mixture generally lacks voids and has randomly oriented fibers and a malleable consistency. The mixture is then loaded into a press and is compressed by male and female molds. This compression molding technique provides uniform structure to the preform. Once the preform is molded, it is removed from the press and is dried in a humid environment, supported by an absorptive liner. Once water is removed from preform, the preform and the absorbing liner are heated to extreme temperatures to remove organic materials and to fuse inorganic ceramic particles. Upon cooling, the ceramic preform is machined to proper dimensions, the outer layer of skin is removed, and the pores of preform are exposed. As noted above, a preform can be prepared using a dry pressing technique where water is not included in the mixture.

Next, the preform is generally infiltrated with a metal that is determined based on the desired properties of the MMC component. This is done through placing the heated preform in a die, pressurizing aluminum into the mold cavity with sufficient pressure to impregnate the preform and to reach the desired casting pressure. The cast part may then undergo heat treating and machining to the desired characteristics and dimensions of the vehicle component. For example, the component may undergo a T7 heat treatment process.

During the casting process, molten metal may be pressurized indirectly or directly. Direct pressurization refers to pressurization of the molten metal through the closing of the dies of the mold. Indirect pressurization refers to pressurization of the molten metal with a piston or other mechanism that pressurizes the metal inside of a mold that is already closed.

In some production methods for MMC vehicle components, for example, through horizontal die casting, the preform is loaded on the male portion of the die or cope to align the preform within the component. Loading the preform onto the cope can sometimes lead to broken preforms from misalignment with the cope or from thermal shock. To insert the preform on the cope of the die without breaking the preform typically requires tight manufacturing tolerances, for example, as little as 0.003" clearance around the preform. After being inserted onto the cope of the die, the mold is closed and molten metal is injected into the mold at high pressure (pressurized indirectly in a shot sleeve or cavity), such as, for example, about 7,000 to about 12,000 pounds per square inch. The high pressure molten metal may also impinge on the preform unevenly, which may also break the preform or push it out of alignment.

Similar issues may arise through direct squeeze casting. In direct squeeze casting, the preform is loaded into the female portion of the die and molten metal is added before the die is closed. The male portion of the die is then closed to pressurize the molten metal and squeeze it into the preform. During the squeezing process the molten metal flows around the preform and may break the preform or push it out of alignment.

To aid the alignment of the preform during casting, the cope of the mold used in these casting techniques is typically tapered between about 0.75° and about 1.5°. The taper also facilitates removal of the cast part from the mold. After casting, the MMC material is machined to remove the draft angle to produce a desired shape. Machining the aluminum MMC is significantly more difficult than machining pure aluminum because of the highly abrasive silicon carbide in the MMC. As noted above, this also leads to increased cost due to the use of sharp and expensive diamond-based tools. The aluminum alloy containing silicon carbide from the MMC removed from the drum during machining is generally scrap material and cannot be recycled.

According to the embodiments of the present application, MMC vehicle components are formed through an isostatic infiltration process. Exemplary casting methods and devices of the present application reduce the stress experienced by the preform during setup and casting and decrease the amount of scrap produced during the casting process. As described herein, the term "isostatic infiltration" describes infiltrating the preform with molten metal such that the pressure exerted by the metal on the mold and the preform is uniform or evenly distributed across the entirety of the molten metal. Thus, the preform is not disturbed by the molten metal and maintains its position during casting. Isostatic infiltration may be performed through an indirect squeeze casting technique involving placing a preform into the female portion of the mold, closing the mold, filling the mold with molten metal, and then pressurizing the molten metal to cause it to infiltrate the preform.

The devices and methods of the present application allow the position of the ceramic preform to be maintained during casting, thereby increasing the precision of the positioning of the MMC portion within the cast component and reducing waste and non-recyclable scrap material. Because the preform can be selectively positioned within the MMC vehicle component, the component includes a MMC portion and a metal portion that is substantially free from MMC material. Selective positioning of the preform within the MMC vehicle component while maintaining the preform in a spaced apart relationship with the mold surfaces also allows a smaller preform to be used without the preform being cracked during loading into the mold. Using a smaller preform reduces the overall cost of the MMC vehicle component as the materials used to form the preform are typically more expensive than the metal alloy.

An exemplary squeeze casting apparatus of the present application includes a male die portion—known as the "cope"—and a female die portion—known as the "drag," each having a mold surface. A mold cavity is formed between the mold surfaces of the male and female dies when the mold is in a closed condition. At least one of the dies further include pegs or spacers that support the preform in a spaced apart relationship with at least one of the mold surfaces of the male and female die portions during the casting process. That is, these spacers or pegs allow the preform to be positioned within the die such that the some or all of the surfaces of the preform do not touch the mold surfaces. These spacers allow the preform to be precisely positioned within the mold cavity without the need to locate the preform on the cope of the male die, as described above, thereby reducing the likelihood that the preform is damaged during loading into the mold. The spacers also reduce the contact between the mold and the preform so that less heat is lost from the preform as the mold is closed and before molten metal is introduced into the mold cavity. As the mold cavity is filled, the spacers provide room between the preform and the mold surfaces so that the molten metal can flow freely and present equal pressure on all sides of the preform so that the preform is not broken or displaced by the flowing molten metal. These spacers may be machined into the female die, or may be separate from the die. The spacers may be tapered—with a larger base at the mold and a smaller portion at the preform—and have any shape, such as, for example, a cone, a cylinder, a ridge, a dome, a pyramid, or the like. In some embodiments, the spacers are formed of a material that is infiltrated or consumed during casting (e.g., the material of the preform), thereby becoming a portion of the cast part. The spacers may also be extended portions of the preform—e.g., "stilts"—that support the preform above the surface of the female die and locate the preform within the mold cavity.

As a further benefit, the exemplary casting techniques described in the present application can be used to cast vehicle components with metal alloys that are typically considered difficult to cast and infiltrate in MMC components, such as metal alloys with low magnesium content. For example, alloys 319, 355, 356, and 357 Aluminum, may be used in exemplary casting processes disclosed herein.

As yet another benefit, the exemplary casting techniques in the present application allow the cast parts to be heat treated using a T7 heat treatment process. The T7 heat treatment process involves heating the part up to the solution phase, quenching, and then aging the cast part. Parts cast using high pressure die casting techniques are difficult to treat using the T7 process because the porous internal structure of the die cast part results in gas inclusions that blister in the solution phase. Parts made using the casting techniques disclosed herein do not suffer from this issue.

Referring now to FIG. 1, an exemplary mold 100 for isostatic casting of a metal matrix composite brake drum according to an embodiment of the present application is shown. The mold 100 includes a male die portion 110 having a mold surface 112 and a female die portion 120 having a mold surface 122. The female die 120 includes spacers 130 extending above the mold surface 122. The male die portion 110 includes a pressurization chamber 102 for pressurizing molten metal during casting. In some embodiments, the positions of the male and female die portions may be reversed.

Spacers 130 may be included in both of the male and female dies 110, 120 and may be located anywhere within a mold cavity 140 (see FIGS. 2-3) and may support a ceramic preform 150 (see FIGS. 2-3) from below, above, the sides, and/or any combination of the same. The spacers 130 maintain the preform 150 in a spaced apart relationship with at least one of the mold surfaces 112, 122. Though four spacers 130 are shown in the illustrated embodiment, any number of spacers 130 may be included in the mold 100. The spacers 130 can be formed of the same material as the preform 150 or another temperature resistant material, such as a ceramic or a metal alloy (e.g., tool steel or cast iron). As described above, the spacers 130 are tapered—i.e., the spacers have a draft—to enable removal after infiltration and casting of the component. The reduced contact area at the top of the spacers 130 reduces heat transfer away from the spacer 130 and into the mold 100. As described above, spacers can be included on any surface of the mold to contact any portion of the preform. For example, spacers can be included on the top and bottom of the preform to space it apart from both the top and bottom mold surfaces. The preform may also be held in place on spacers by gravity.

The spacers 130 can be permanently formed in one or both of the dies 110, 120. Spacers 130 that are integrally formed with the dies 110, 120 are have a draft or taper towards the preform 150 to provide relief when removing the cast part from the mold 100. The integrally formed spacers 130 are generally formed of the same material of the mold 100, such as, for example, tool steel. As needed, removable spacers may be used in conjunction with integrally formed spacers. Removable spacers permit the same mold to be used to product a part with or without a localized MMC portion. Spacers may also include tapered alignment portions 132 to aid in the alignment of the preform during loading of the preform into the casting device. Spacers may extend from the mold surface any distance necessary to locate the preform in the desired location, depending on the shape of the mold cavity and the particular application. In certain embodiments, the spacers extend from the mold surface about 0.05 inches to about 0.2 inches, or at least about 0.1 inches, or at least about 0.05 inches.

Figure 2:
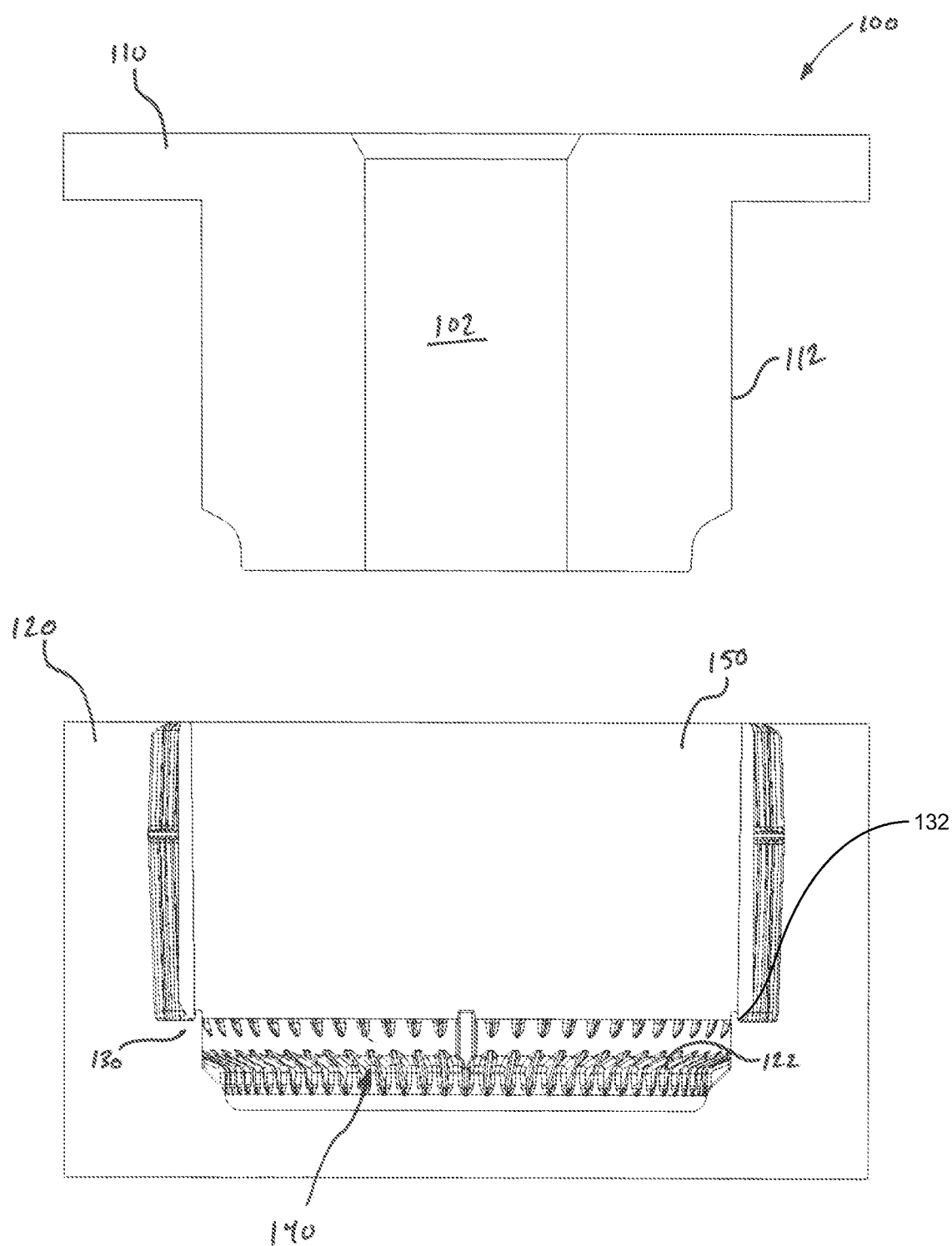
FIG. 2 is a cross-section view of the casting device of FIG. 1 along the line A-A with the casting device in an open condition and a preform positioned within the female die.

Referring now to FIG. 2, a cross-section of the mold of FIG. 1 along the line A-A is shown. The mold 100 is shown in an open condition with the male and female dies 110, 120 spaced apart. The ceramic preform 150 is positioned on the spacers 130 in the female die 120 and is spaced apart from the mold surface 122. Draft angles may be provided in either or both of the male and female die portions 110, 120 to enable removal of the component after casting.

Figure 3:
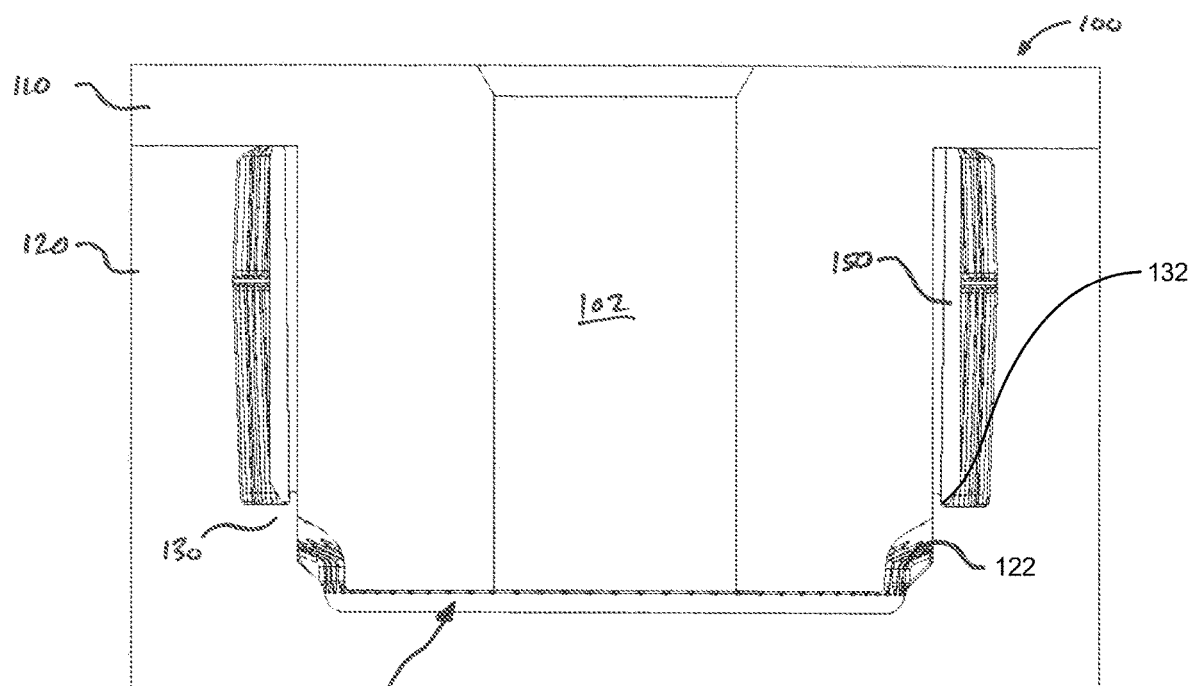
FIG. 3 is a cross-section view of the casting device of FIG. 1 along the line A-A with the casting device in a closed condition and a preform positioned within the female die.

Referring now to FIG. 3, the mold 100 is shown in a closed condition. The mold surfaces 112, 122 of the male and female die portions 110, 120 form the mold cavity 140 surrounding the preform 150. The male and female dies 110, 120 are moved into contact with each other and locked together so that they are not separated during pressurization of the mold cavity 140.

Figure 4:
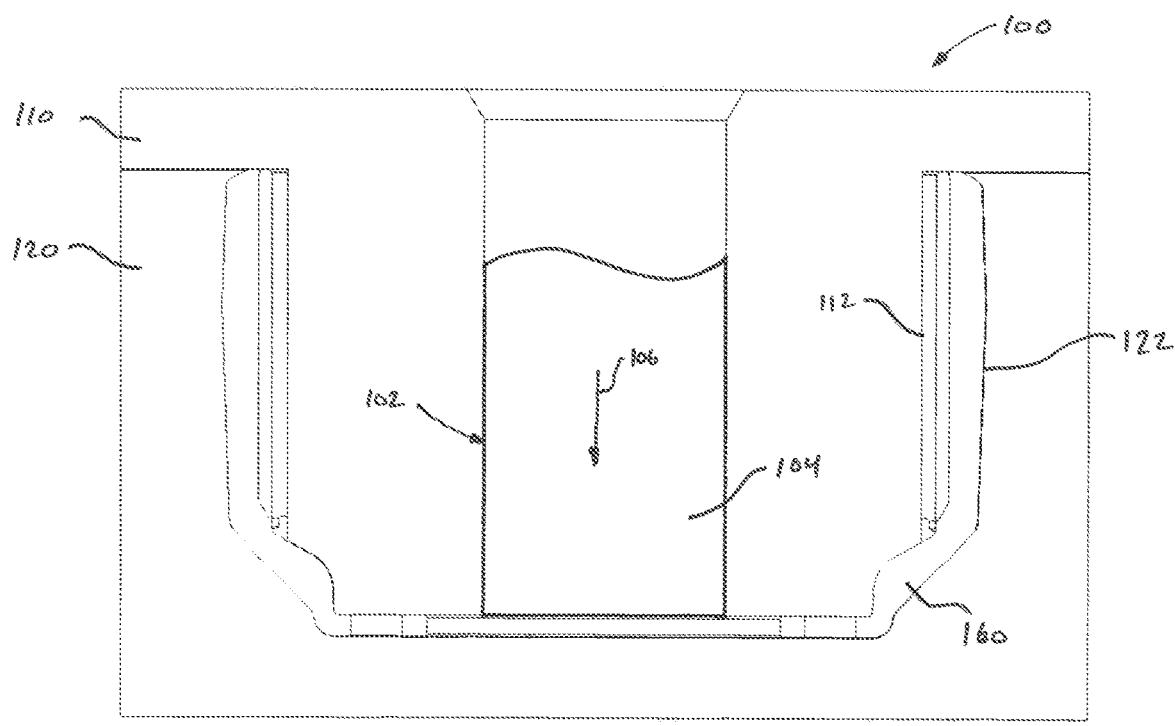
FIG. 4 is a cross-section view of the casting device of FIG. 1 along the line A-A with the casting device in a closed condition and molten metal filling the die cavity.
Figure 4:
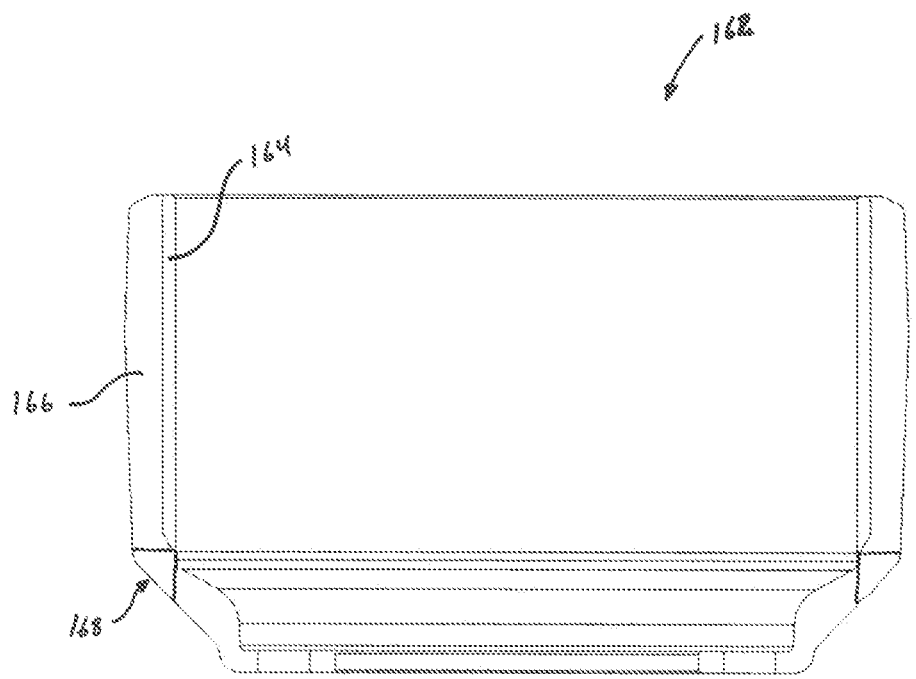

Referring now to FIG. 4, the mold 100 is shown in a closed condition and filled with molten metal 160. A pressurization piston 106 presses down through the pressurization chamber 102 in the direction of arrow 104 to pressurize the molten metal 160 to cause it to fill the mold cavity 140 and infiltrate the preform 150.

Referring now to FIG. 5, exemplary brake drum 162 is shown removed from the mold 100 and in a final, machined condition. The brake drum 162 includes a MMC portion 164 and a metal portion 166 that is substantially free of MMC material. Indentations 168 extending from an outer surface of the metal portion 166 to the MMC portion 164 are formed in the metal portion 166 by the spacers 130, as described above. The MMC portion 164 can have a thickness ranging from about 0.05 inches to the entire thickness of the component. In certain embodiments, the MMC portion has a thickness ranging from about 0.2 inches to about 0.5 inches, or from about 0.25 inches to about 0.45 inches.

Excess aluminum removed after casting of the brake drum 162 can substantially cover the inner and outer diameters of the preform 150. Because the mold surfaces 112, 122 are not used to position the preform 150 in the mold cavity 140, the gap between the preform 150 and the mold surfaces 112, 122 is filled with metal that is substantially free from MMC materials. To remove this excess material, a two-part machining process can be used. A first machining step involves removing the metal portion using traditional machining tools without the need for special tools used to machine MMC materials. A second machining step involves using special tools to form the finished surface of the MMC portion. Material removed during the first machining step is substantially free from MMC materials and can recycled, reducing waste produced during the production of the MMC vehicle component.

Figure 6:
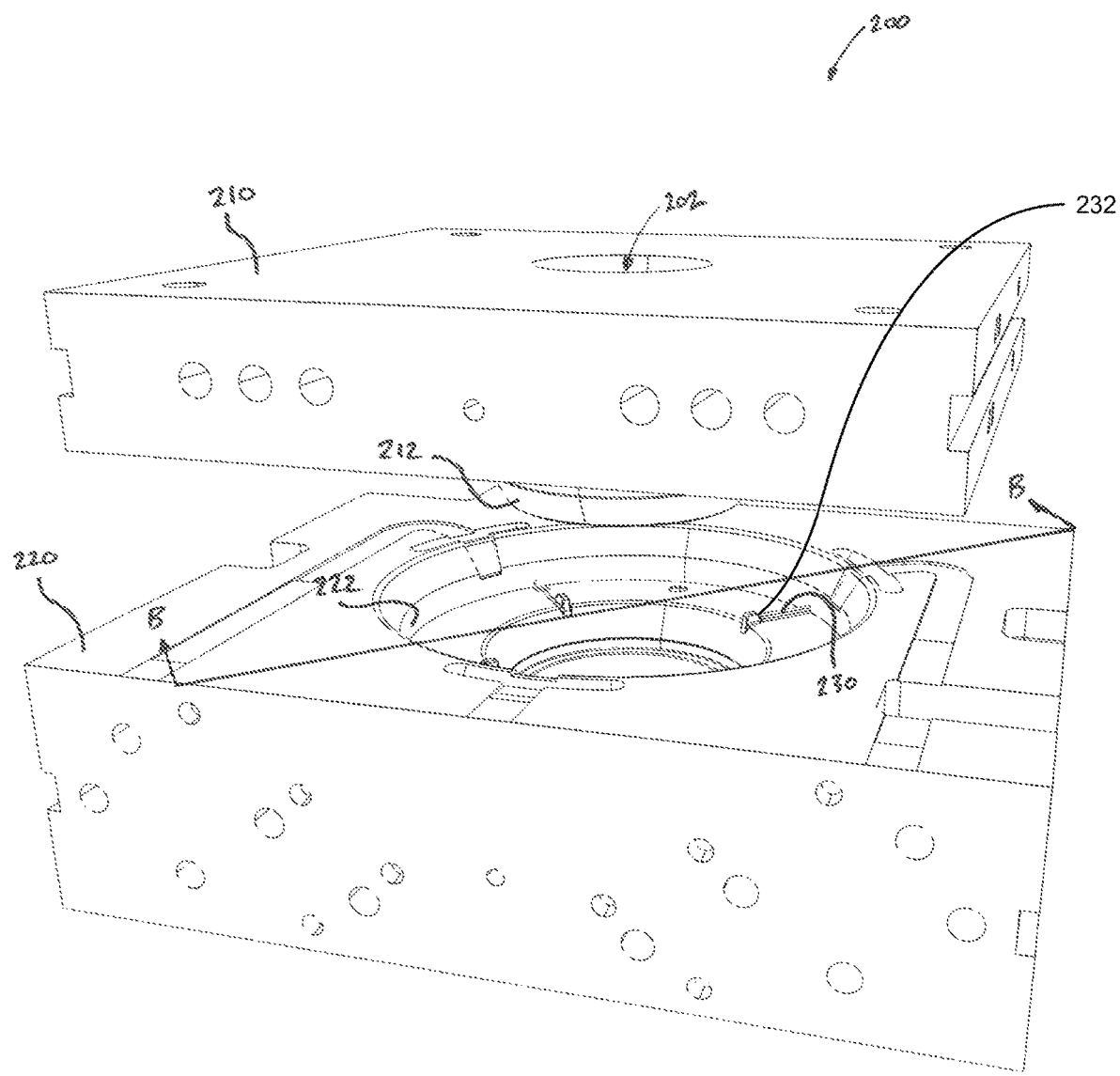
FIG. 6 is a perspective view of an exemplary casting device for a metal matrix composite break rotor with the casting device in an open condition.

Referring now to FIG. 6, an exemplary mold 200 for isostatic casting of a metal matrix composite brake disc is shown. The mold 200 includes a male die portion 210 having a mold surface 212 and a female die portion 220 having a mold surface 222. The female die 220 includes spacers 230 extending above the mold surface 222. The male die portion 210 includes a pressurization chamber 202 for pressurizing molten metal during casting. In some embodiments, the positions of the male and female die portions may be reversed.

Spacers 230 may be included in both of the male and female dies 210, 220 and may be located anywhere within a mold cavity 240 (see FIGS. 2-3) and may support a ceramic preform 250 (see FIGS. 2-3) from below, above, the sides, and/or any combination of the same. The spacers 230 maintain the preform 250 in a spaced apart relationship with at least one of the mold surfaces 212, 222. Though four spacers 230 are shown in the illustrated embodiment, any number of spacers 230 may be included in the mold 200. The spacers 230 can be formed of the same material as the preform 250 or another temperature resistant material, such as a ceramic or a metal alloy (e.g., tool steel or cast iron). As described above, the spacers 230 are tapered—i.e., the spacers have a draft—to enable removal after infiltration and casting of the component. The reduced contact area at the top of the spacers 230 reduces heat transfer away from the spacer 230 and into the mold 200.

The spacers 230 can be permanently formed in one or both of the dies 210, 220. Spacers 230 that are integrally formed with the dies 210, 220 have a draft or taper towards the preform 250 to provide relief when removing the cast part from the mold 200. The integrally formed spacers 230 are formed of the same material of the mold 200, such as, for example, tool steel. As needed, removable spacers may be used in conjunction with integrally formed spacers. Removable spacers permit the same mold to be used to product a part with or without a localized MMC portion. Spacers may also include tapered alignment portions 232 to aid in the alignment of the preform during loading of the preform into the casting device. Spacers may extend from the mold surface any distance necessary to locate the preform in the desired location, depending on the shape of the mold cavity and the particular application. In certain embodiments, the spacers extend from the mold surface about 0.05 inches to about 0.2 inches, or at least about 0.1 inches, or at least about 0.05 inches.

Figure 7:
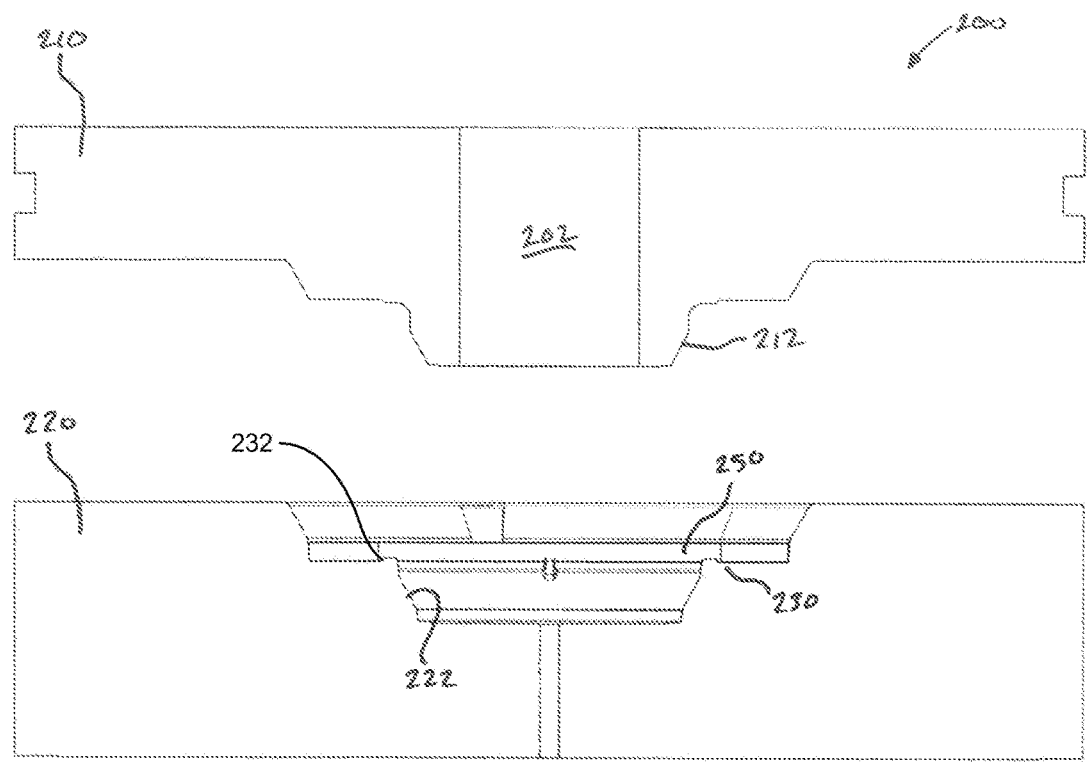
FIG. 7 is a cross-section view of the casting device of FIG. 6 along the line B-B with the casting device in an open condition and a preform positioned within the female die.

Referring now to FIG. 7, a cross-section of the mold of FIG. 6 along the line B-B is shown. The mold 200 is shown in an open condition with the male and female dies 210, 220 spaced apart. The ceramic preform 250 is positioned on the spacers 230 in the female die 220 and is spaced apart from the mold surface 222. Draft angles may be provided in either or both of the male and female die portions 210, 220 to enable removal of the component after casting.

Figure 8:
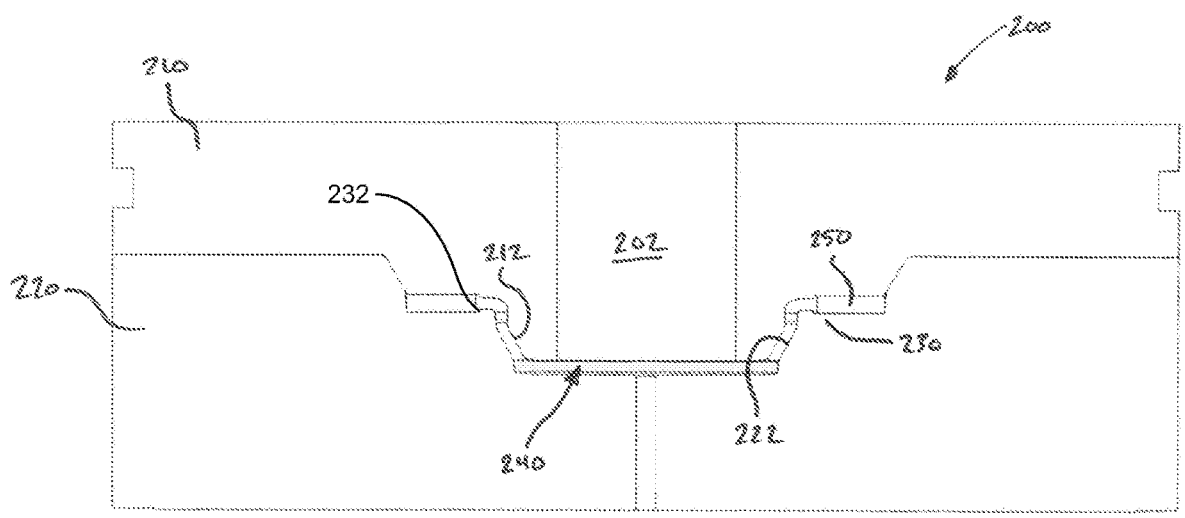
FIG. 8 is a cross-section view of the casting device of FIG. 6 along the line B-B with the casting device in a closed condition and a preform positioned within the female die.

Referring now to FIG. 8, the mold 200 is shown in a closed condition. The mold surfaces 212, 222 of the male and female die portions 210, 220 form the mold cavity 240 around the preform 250. The male and female dies 210, 220 are moved into contact with each other and locked together so that they are not separated during pressurization of the mold cavity 240.

Figure 9:
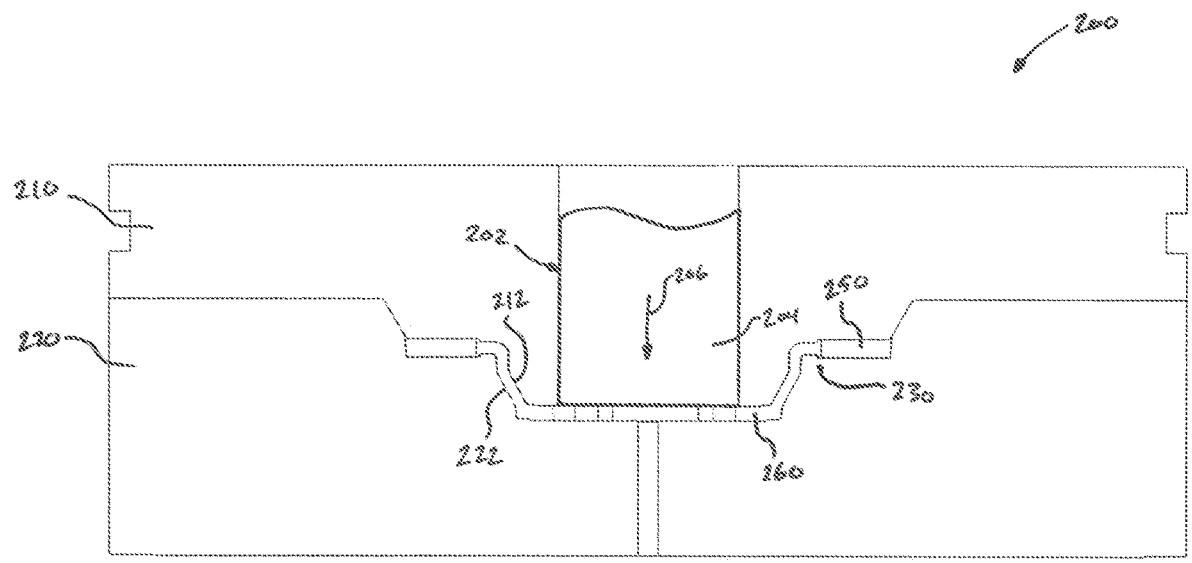
FIG. 9 is a cross-section view of the casting device of FIG. 6 along the line B-B with the casting device in a closed condition and molten metal filling the die cavity.

Referring now to FIG. 9, the mold 200 is shown in a closed condition and filled with molten metal 260. A pressurization piston 206 presses down through the pressurization chamber 202 in the direction of arrow 204 to pressurize the molten metal 260 to cause it to fill the mold cavity 240 and infiltrate the preform 250.

Figure 10:
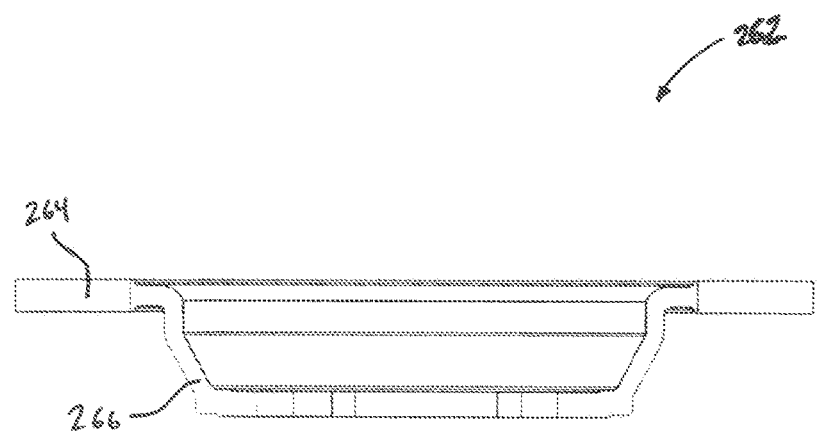
FIG. 10 is a cross-section view an exemplary brake rotor removed from the casting device of FIG. 9 that is shown cross-sectioned along the line B-B.

Referring now to FIG. 10, exemplary brake disc 262 is shown removed from the mold 200 and in a final, machined condition. The brake disc 262 includes a MMC portion 264 and a metal portion 266 that is substantially free of MMC material. Indentations (not shown) extending from an outer surface of the metal portion 266 to the MMC portion 264 are formed in the metal portion 266 by the spacers 230. In the illustrated embodiment, the indentations are not evident in the final, machined condition of the brake disc 262 because the metal portion 266 is machined away from both sides of the MMC portion 264 after casting. In certain embodiments, indentations are present in the final, machined brake disc 262. The MMC portion 264 can have a thickness ranging from about 0.05 inches to the entire thickness of the component. In certain embodiments, the MMC portion has a thickness ranging from about 0.2 inches to about 0.5 inches, or from about 0.25 inches to about 0.45 inches.

Excess aluminum removed after casting of the brake disc 262 can substantially cover the top and bottom surfaces of the preform 250. Because the mold surfaces 212, 222 are not used to position the preform 250 in the mold cavity 240, the gap between the preform 250 and the mold surfaces 212, 222 is filled with metal that is substantially free from MMC materials. To remove this excess material, a two-part machining process can be used. A first machining step involves removing the metal portion using traditional machining tools without the need for special tools used to machine MMC materials. A second machining step involves using special tools to form the finished surface of the MMC portion. Material removed during the first machining step is substantially free from MMC materials and can be recycled, reducing waste produced during the production of the MMC vehicle component.

While various embodiments described and illustrated herein show a single preform used to form an MMC vehicle component, a plurality of preforms may be supported by spacers in a mold for forming a MMC vehicle component having one or more MMC portions. Also, though the molds shown in FIGS. 1-10 are arranged with a vertical orientation, the casting techniques of the present application may also be applied to horizontal casting devices or any casting device oriented at any angle.

Figure 11:
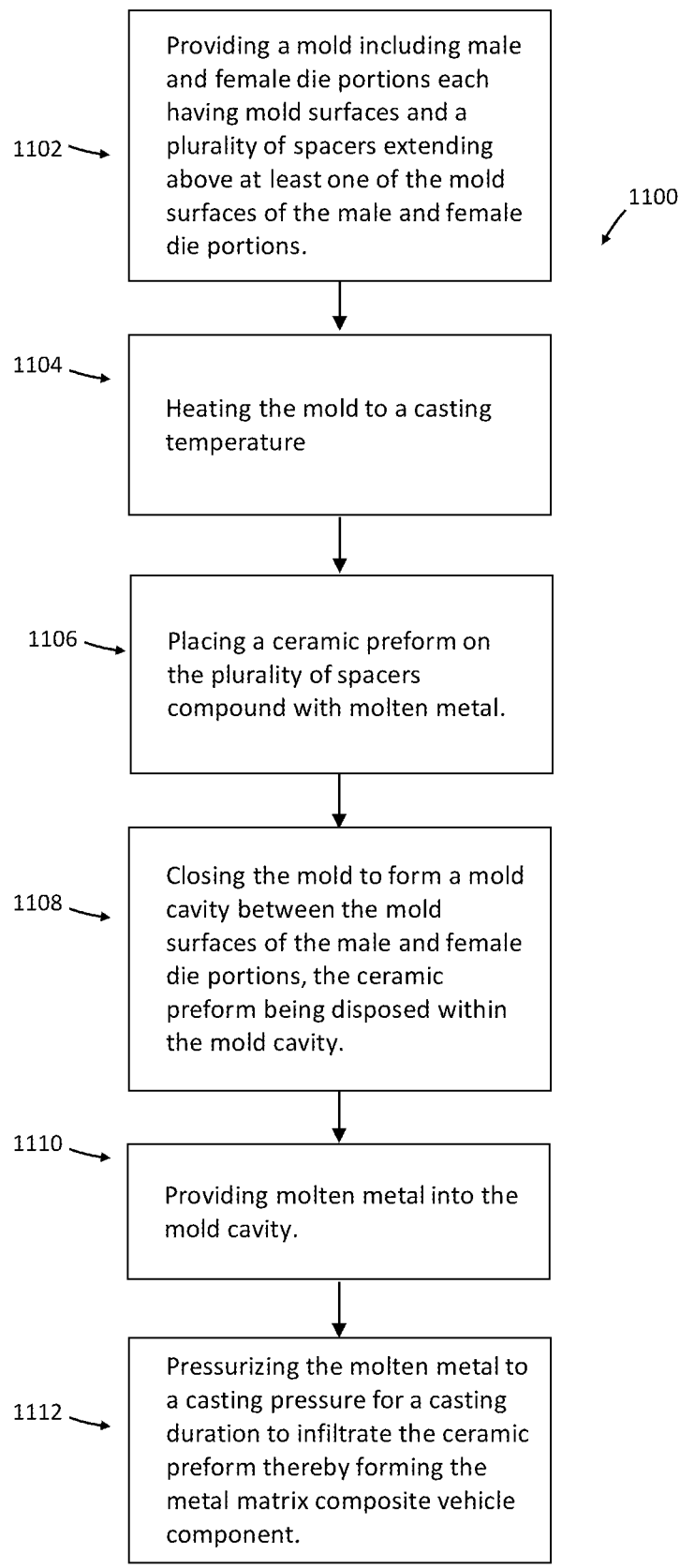
FIG. 11 is a flow chart describing an exemplary method of making metal matrix composite vehicle components.

Referring now to FIG. 11, a flow chart of an exemplary method 1100 of forming a metal matrix composite vehicle component is shown. The exemplary method 1100 includes: providing a mold including male and female die portions each having mold surfaces and a plurality of spacers extending from or above at least one of the mold surfaces of the male and female die portions, at 1102; heating the mold to a casting temperature, at 1104; placing a ceramic preform on the plurality of spacers such that the preform is spaced away from the mold surfaces, at 1106; closing the mold to form a mold cavity between the mold surfaces of the male and female die portions, the ceramic preform being disposed within the mold cavity, at 1108; providing molten metal into the mold cavity, at 1110; and pressurizing the molten metal to a casting pressure for a casting duration to infiltrate the ceramic preform thereby forming the metal matrix composite vehicle component, at 1112. Exemplary method 1100 can be implemented with any of the casting devices described above.

In certain embodiments, the casting temperature can range from about 500° Fahrenheit to about 1,200° Fahrenheit, or can be about 1,000° Fahrenheit or more. The preform may be heated from about 1,000° Fahrenheit to about 1,500° Fahrenheit, or more than about 1,500° Fahrenheit before being placed in the mold. During infiltration, the molten aluminum can range from about 1,000° Fahrenheit to about 1,200° Fahrenheit, depending on the alloy used. The casting pressure can range from about 10,000 pounds per square inch to about 16,000 pounds per square inch, or can be about 15,000 pounds per square inch or more. In certain embodiments, a clamping force required to hold the die portions of the mold together is about 1,000 tons. The casting duration is generally not greater than about three minutes, or is in a range from about 20 seconds to about 40 seconds, or is about 27 seconds. Applicant notes that in certain embodiments, lower temperatures and pressures may be used to cast metal matrix vehicle components, such as a casting temperature ranging from about 400° Fahrenheit to about 600° Fahrenheit, and a casting pressure ranging from about 8,000 pounds per square inch to about 12,000 pounds per square inch.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein.

Additionally, even though some features, concepts, or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated.

Moreover, while various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

What is claimed is:

1. A method of making a metal matrix composite vehicle component, the method comprising:
    using a mold comprising:
        a male die portion having a mold surface;
        a female die portion having a mold surface; and
        a plurality of spacers, each spacer comprising a support surface and an alignment surface extending from at least one end of the support surface at an alignment angle, and wherein the plurality of spacers comprises a first spacer and a second spacer;
    heating the mold to a casting temperature;
    placing a ceramic preform on the plurality of spacers, wherein:
        the ceramic preform is spaced apart from at least one of the mold surfaces in a first direction by the support surfaces of both of the first spacer and the second spacer;
        the alignment angle of the alignment surface of the first spacer facilitates the alignment of the ceramic preform in a second direction that is orthogonal to the first direction; and
        the alignment angle of the alignment surface of the second spacer facilitates the alignment of the ceramic preform in a third direction that is orthogonal to the first direction and is different from the second direction;
    closing the mold to form a mold cavity between the mold surfaces of the male and female die portions, the ceramic preform being disposed within the mold cavity;
    providing molten metal into the mold cavity; and
    pressurizing the molten metal to a casting pressure for a casting duration to infiltrate the ceramic preform thereby forming the metal matrix composite vehicle component;
    wherein the first spacer and the second spacer have a longitudinal axis that extends radially from a center axis of the mold;
    wherein the alignment surface of the first spacer is disposed radially inward from the support surface of the first spacer; and the alignment surface of the second spacer is disposed radially inward from the support surface of the second spacer;
    wherein the second direction is parallel to the longitudinal axis of the first spacer; and the third direction is parallel to the longitudinal axis of the second spacer.

2. The method of claim 1, wherein pressurizing the molten metal comprises isostatic pressurization of the mold cavity wherein the molten metal exerts substantially equal pressure on sides of the ceramic preform exposed to the molten metal.

3. The method of claim 1, wherein:
    the ceramic preform comprises ceramic particles, reinforcing fibers, and a high temperature binder; and
    the ceramic preform has a porosity ranging from about 50 percent to about 80 percent.

4. The method of claim 3, wherein the ceramic preform has a porosity of about 60 percent.

5. The method of claim 1, wherein:
    the casting temperature ranges from about 500° Fahrenheit to about 1,200° Fahrenheit;
    the casting pressure ranges from about 10,000 pounds per square inch to about 16,000 pounds per square inch; and
    the casting duration is not greater than about three minutes.

6. The method of claim 1, wherein the casting pressure ranges from about 8,000 pounds per square inch to about 12,000 pounds per square inch.

7. The method of claim 1, wherein the casting temperature ranges from about 400° Fahrenheit to about 600° Fahrenheit.

8. The method of claim 1, wherein the casting duration is about 27 seconds.

9. The method of claim 1, further comprising:
    heat treating the metal matrix composite vehicle component.

10. The method of claim 1, wherein the mold comprises at least three spacers.

11. The method of claim 10, wherein the at least three spacers are evenly spaced apart from each other within the mold cavity.

12. The method of claim 1, wherein the ceramic preform is centered around a spacer axis formed between the spacers and supported substantially equally by each of the spacers prior to closing the mold and forming the mold cavity.

13. The method of claim 1, wherein:
    the female die portion is a bottom die portion having a bottom mold surface; and
    the spacers extend above the bottom die portion and are configured to space the preform apart from the bottom mold surface.

14. The method of claim 1, wherein the metal matrix composite vehicle component comprises:
    a metal matrix composite portion; and
    a metal portion that is substantially free from metal matrix composite material.

15. The method of claim 14, wherein at least a portion the metal matrix composite portion is disposed at an exterior surface of the metal matrix composite vehicle component.

16. The method of claim 1, wherein the ceramic preform is a ring shape with an interior diameter that is aligned in the second direction by the alignment surface of the first spacer and in the third direction by the alignment surface of the second spacer.

17. The method of claim 1, wherein the ceramic preform is a ring shape extending between an interior diameter and an outer diameter and the support surface of the first spacer and the second spacer each have a width that is at least as wide as a distance between the inner and outer diameters of the ceramic preform.

18. The method of claim 1, wherein at least one of the male die portion and female die portion comprise a draft angle that engages an outer diameter of the ceramic preform to facilitate alignment of the ceramic perform in the second direction.

* * * * *